Oct. 27, 1925.

W. B. FLOYD 1,558,857

SELF LUBRICATING AXLE

Filed Oct. 7, 1924

Inventor
WALTER B. FLOYD

Patented Oct. 27, 1925.

1,558,857

UNITED STATES PATENT OFFICE.

WALTER B. FLOYD, OF COLUMBUS, OHIO, ASSIGNOR TO THE BONNEY-FLOYD COMPANY, OF COLUMBUS, OHIO, A CORPORATION OF OHIO.

SELF-LUBRICATING AXLE.

Application filed October 7, 1924. Serial No. 742,184.

*To all whom it may concern:*

Be it known that WALTER B. FLOYD, a citizen of the United States, residing at Columbus, in the county of Franklin and State of Ohio, has invented new and useful Improvements in Self-Lubricating Axles, of which the following is a specification.

The present invention relates to vehicle axles, and more particularly to axles intended for use in connection with mine or industrial cars.

An object of the invention is to provide an axle, preferably of cast construction, having integrally formed therewith wheel spindles, means for securing the axle to a car body, and lubricant reservoirs communicating with the spindles.

A further object of the invention is to provide in an axle of this character a separate lubricant reservoir for each spindle and to construct the axle with the reservoirs located between the spindles.

Another object of the invention is to provide a closure means for the ends of the spindles which will retain the lubricant therein and at the same time serve to prevent removal of wheels from the spindles, each closure having associated therewith a retaining device which extends through the spindle and lubricant reservoir and is anchored within the axle.

Figure 1:
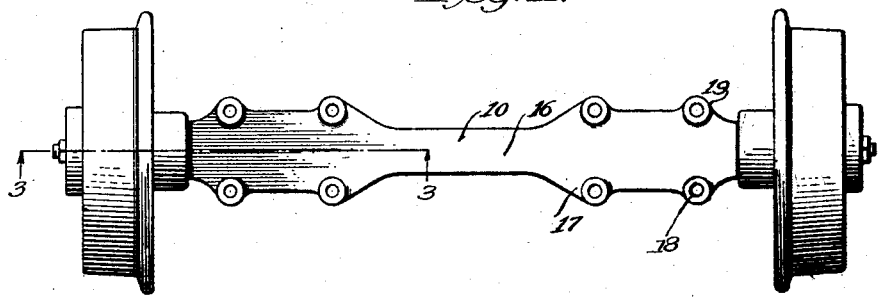
Figure 2:
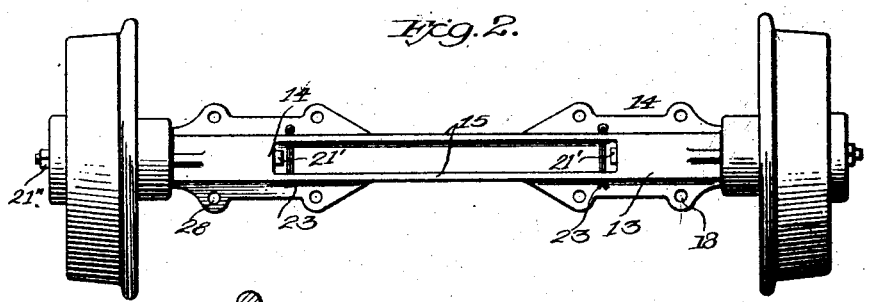
Figure 3:
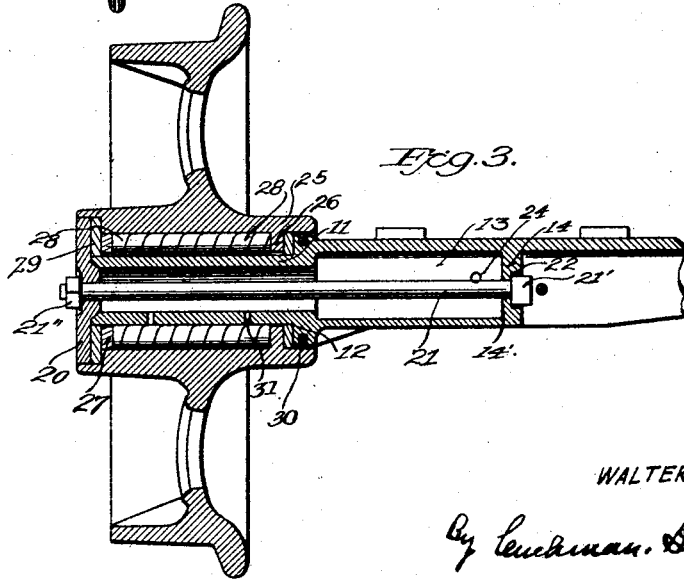

In the accompanying drawings there is shown one embodiment of the invention, and Figure 1 is a top plan view, Figure 2 is a bottom plan, and Figure 3 is a partial longitudinal section on the line 3—3 of Figure 1.

Referring to the drawings for a more detailed description, 10 indicates the axle, the ends of which are reduced to form integral spindles, the inner ends of each spindle terminating at a shoulder 12 upon their exterior and open interiorly into a lubricant reservoir 13. Each reservoir terminates at a transverse web 14, which constitutes an end wall, and, as will be noted from Figure 2, between the end walls 14 of the two reservoirs the axle is channeled, having side ribs 15 and an open bottom.

Projecting laterally from the axle adjacent its top surface 16 are webs or shoulders 17 integrally formed therewith and having bolt openings 18, which extend through bosses 19. The bosses 19 serve to fit into suitable sockets in the floor of a car, and, together with the securing bolts, hold the axle against turning movement under torsional stresses.

For closing the ends of each spindle there is provided a cap 20, which may be secured in position by means of a rod or bolt 21 extending through the cap and traversing the spindle and lubricant reservoir, one end of the bolt being suitably anchored in the wall 14 and the other end carrying a cap clamping nut 21''. The bolt may extend through opening 14' in the wall with its head 21' suitably seated in a socket 22. For the purpose of holding the bolt against longitudinal movement when the cap 20 is removed, a cotter pin 23 may be extended across the axle in alignment with the bolt head 21 and adjacent the same. It will be understood, of course, that it may be desirable at times to remove the caps 20 for the purpose of filling the lubricant reservoir, although this may be accomplished through a lateral port 24 provided for this purpose.

The caps 20 are preferably of considerably larger diameter than the spindles in order to serve as wheel retaining means. Any suitable form of wheel mounting may be employed, the wheels shown in the drawings having hubs 25 carrying internal ribs 26, which, together with a removable ring 27, constitute a raceway for roller bearings 28. Each end ring 27 may be retained in position by thrust washer 29 between the ring and the cap 20. The caps 20 and thrust washers 29 are fitted within the hub 25 and the opposite end of the hub extends over the shoulder 12, the periphery of which may carry in a groove a packing 30 to prevent leakage of the lubricant which passes from the interior of the spindle to the bearings through openings 31.

It will be noted that the entire axle is of unitary or integral construction, including the spindles, lubricant container, and means for fastening the same to the car. Moreover, the arrangement of the reservoirs spaced apart longitudinally of the axle and with separate reservoir for each spindle insures an even flow of lubricant to the spindles and at the same time permits the use of a comparatively simple securing means for the wheels, which, also, closes the ends of the axle spindles.

Obviously, numerous modifications may be made in the structure illustrated and described without departing from the scope of the invention, which is defined in the following claims.

I claim:

1. As an article of manufacture, an integral axle for a car having hollow integral spindles at its ends, said axle being formed between said spindles with a separate integral lubricant reservoir for each spindle, the reservoirs leading into the spindles, means for passing the lubricant to the exterior of the spindles, and integral body attaching means extending outwardly from the axle between the spindles.

2. As an article of manufacture, an axle for a car having hollow integral spindles at its end, said axle being integrally formed between said spindles with a separate lubricant reservoir for each spindle, the reservoirs leading into the spindles, means for passing the lubricant to the exterior of the spindles, and integral body attaching means extending outwardly from the axle between the spindles, caps closing the ends of the spindles, and a retaining bolt for each cap extending through a spindle and anchored in a transverse web within said axle.

3. As an article of manufacture, an axle for a car having hollow integral spindles at its end, said axle being integrally formed between said spindles with a separate lubricant reservoir for each spindle, the reservoirs leading into the spindles, means for passing the lubricant to the exterior of the spindles, integral body attaching means extending outwardly from the axle between the spindles, caps closing the ends of the spindles, and a retaining bolt for each cap extending through a spindle and anchored in a transverse web within said axle, said web constituting an end wall of a lubricant reservoir.

4. As an article of manufacture, an axle for a car having hollow integral spindles at its ends, said axle being integrally formed between said spindles with a separate reservoir for each spindle, transverse integral webs within the axle spaced apart longitudinally thereof and forming inner end walls for said reservoirs, the interior of the axle between said transverse webs being open for access, means closing the ends of said spindles, said reservoirs opening into the spindles, and means for passing lubricant to the exterior of the spindles.

5. As an article of manufacture, an axle for a car having hollow integral spindles at its ends, said axle being integrally formed between said spindles with a separate reservoir for each spindle, transverse integral webs within the axle spaced apart longitudinally thereof and forming inner end walls for said reservoirs, the axle being channeled and open between said webs, caps closing the ends of said spindles, said reservoirs opening into the spindles, means for passing lubricant to the exterior of the spindles, and retaining bolts for said spindle caps passing through the spindles and said webs and anchored in the latter.

6. As an article of manufacture, an axle for a car having hollow integral spindles at its ends, said axle being integrally formed between said spindles with a separate reservoir for each spindle, transverse integral webs within the axle spaced apart longitudinally thereof and forming inner end walls for said reservoirs, the axle being channeled and open between said webs, caps closing the ends of said spindles, said reservoirs opening into the spindles, means for passing lubricant to the exterior of the spindles, and retaining bolts for said spindle caps passing through the spindles and said webs and anchored in the latter, said spindle caps serving also to retain wheels on the spindles.

In testimony whereof I have hereunto set my hand.

WALTER B. FLOYD.